(12) United States Patent
Tomaszewski et al.

(10) Patent No.: US 12,435,621 B2
(45) Date of Patent: Oct. 7, 2025

(54) SYSTEMS AND METHODS FOR MEASURING DEPTH WITHIN A BOREHOLE

(71) Applicants: LONGYEAR™, INC., Salt Lake City, UT (US); GLOBALTECH CORPORATION PTY LTD, Forrestfield (AU)

(72) Inventors: Adam Tomaszewski, Ontario (CA); Gordon Stewart, Claremont (AU)

(73) Assignees: Veracio Ltd., Salt Lake City, UT (US); Globaltech Corporation Pty Ltd, Forrestfield (AU)

( * ) Notice: Subject to any disclaimer, the term of this patent is extended or adjusted under 35 U.S.C. 154(b) by 39 days.

(21) Appl. No.: 17/798,362

(22) PCT Filed: Feb. 12, 2021

(86) PCT No.: PCT/IB2021/000089
§ 371 (c)(1),
(2) Date: Aug. 9, 2022

(87) PCT Pub. No.: WO2021/161103
PCT Pub. Date: Aug. 9, 2021

(65) Prior Publication Data
US 2023/0075804 A1  Mar. 9, 2023

Related U.S. Application Data

(60) Provisional application No. 62/975,418, filed on Feb. 12, 2020.

(51) Int. Cl.
*E21B 47/04* (2012.01)
*E21B 44/00* (2006.01)
(Continued)

(52) U.S. Cl.
CPC .............. *E21B 47/04* (2013.01); *E21B 44/00* (2013.01); *E21B 47/02* (2013.01); *E21B 47/09* (2013.01);
(Continued)

(58) Field of Classification Search
CPC .......... E21B 44/00; E21B 47/02; E21B 47/04; E21B 47/09; E21B 47/26; G01B 7/026; G01B 7/04; G01P 15/02
See application file for complete search history.

(56) References Cited

U.S. PATENT DOCUMENTS 4,797,822 A * 1/1989 Peters .................... E21B 47/04
33/304
2015/0226050 A1* 8/2015 Bartel .................... E21B 47/18
700/275

(Continued)

OTHER PUBLICATIONS

International Search Report and Written Opinion were mailed on May 20, 2021 by the International Searching Authority for International Application No. PCT/IB2021/000089 filed on Feb. 12, 2021 and published as WO2021161103 (Applicant—Longyear™, Inc.) (6 pages).

*Primary Examiner* — Caroline N Butcher
(74) *Attorney, Agent, or Firm* — Ballard Spahr LLP

(57) ABSTRACT

A system for determining depth within a borehole. The system includes a downhole device having at least one inertial sensor, at least one processor, and a memory in communication with the at least one processor. The memory can include instructions thereon that, when executed, cause the processor to: receive data from the at least one inertial sensor and store the data from the at least one inertial sensor in the memory with respective correlated time values. The system can further include a drill rig having at least one depth measurement device. The at least one depth measurement device can include a drill string position sensor that is (Continued)

configured to produce a measurement indicative of a length of a portion of a drill string removed from a borehole or a wireline sensor that is configured to determine a length of deployed wireline cable.

20 Claims, 5 Drawing Sheets

(51) Int. Cl.
| | | |
|---|---|---|
| *E21B 47/02* | (2006.01) | |
| *E21B 47/09* | (2012.01) | |
| *E21B 47/26* | (2012.01) | |
| *G01B 7/02* | (2006.01) | |
| *G01B 7/04* | (2006.01) | |
| *G01P 15/02* | (2013.01) | |

(52) U.S. Cl.
CPC .............. *E21B 47/26* (2020.05); *G01B 7/026* (2013.01); *G01B 7/04* (2013.01); *G01P 15/02* (2013.01)

(56) References Cited

U.S. PATENT DOCUMENTS

| | | |
|---|---|---|
| 2016/0348500 A1 | 12/2016 | Piscsalko et al. |
| 2018/0003032 A1* | 1/2018 | Donzier ................... G01V 3/26 |
| 2018/0051554 A1* | 2/2018 | Werkheiser ........... E21B 43/119 |
| 2018/0363392 A1* | 12/2018 | Brandsvoll ........... E21B 19/008 |

\* cited by examiner

| (1) Log Report Header Information | | |
|---|---|---|
| (2) Scale, Legend, etc. | (4) Tool Information (Sensor Location, Calibration Information, Algorithm Version, etc.) | |
| (3) Depth Correlated Gamma | Pull Speed Indicaator | (5) Driller Input Summary |
| | | (6) Log Event Commentary |

FIG. 4

SYSTEMS AND METHODS FOR MEASURING DEPTH WITHIN A BOREHOLE

CROSS-REFERENCE TO RELATED APPLICATION

This application is a national phase filing under 35 U.S.C. § 371 of International Application No. PCT/IB2021/000089, filed Feb. 12, 2021, which claims priority to and the benefit of U.S. Provisional Patent Application No. 62/975,418, filed Feb. 12, 2020. The entirety of each of these applications is hereby incorporated by reference therein.

FIELD

This application relates to data acquisition for boreholes and, in particular, to systems with improved measurement capabilities.

BACKGROUND

Conventional measurement methods for determining depth within a borehole are subject to error and cause further difficulties. For example, wireline depth encoders cannot be used while the drill rig is pulling (e.g., tripping) rods. Moreover, wirelines stretch, thereby injecting error into wireline encoder measurements. Further, wireline encoders can be difficult to set up and calibrate. Additionally, synchronizing data between a wireline encoder and a downhole tool can be problematic.

Similarly, a sum of the lengths of drill string components (e.g., drill rods) in a drill string can be used to approximate the length of the borehole. However, drill string components stretch and compress under tension and compression, respectively, so such an approximation is subject to error.

Pressure sensor-based detection measurements require the borehole to be full of water, so dry holes cannot provide accurate measurements. Further, pressure signals can produce differing results depending on borehole diameter, fluid properties, and other conditions, indicating error in such measurements.

SUMMARY

Disclosed herein, in one aspect, is a system for determining depth within a borehole. The system can comprise a downhole device comprising at least one inertial sensor, at least one processor, and a memory in communication with the at least one processor. The memory can comprise instructions thereon that, when executed, cause the processor to: receive data from the at least one inertial sensor and store the data from the at least one inertial sensor in the memory with respective correlated time values. The system can further comprise a drill rig comprising at least one depth measurement device. The at least one depth measurement device can comprises a drill string position sensor that is configured to produce a measurement indicative of a length of a portion of a drill string removed from a borehole or a wireline sensor that is configured to determine a length of deployed wireline cable.

In one aspect, a method can comprise receiving, from a downhole device, using a computing device, a plurality of inertial measurements and a respective time value for each inertial measurement of the plurality of inertial measurements; receiving, by the computing device, at least one depth measurement indicative of an operative length of a drill string; and determining, by the computing device, a depth of the downhole device within the drill string based on the plurality of inertial measurements and the at least one depth measurement.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

FIG. 4 is a user interface showing a log report including depth measurements within a borehole.

DETAILED DESCRIPTION

Figure 1:
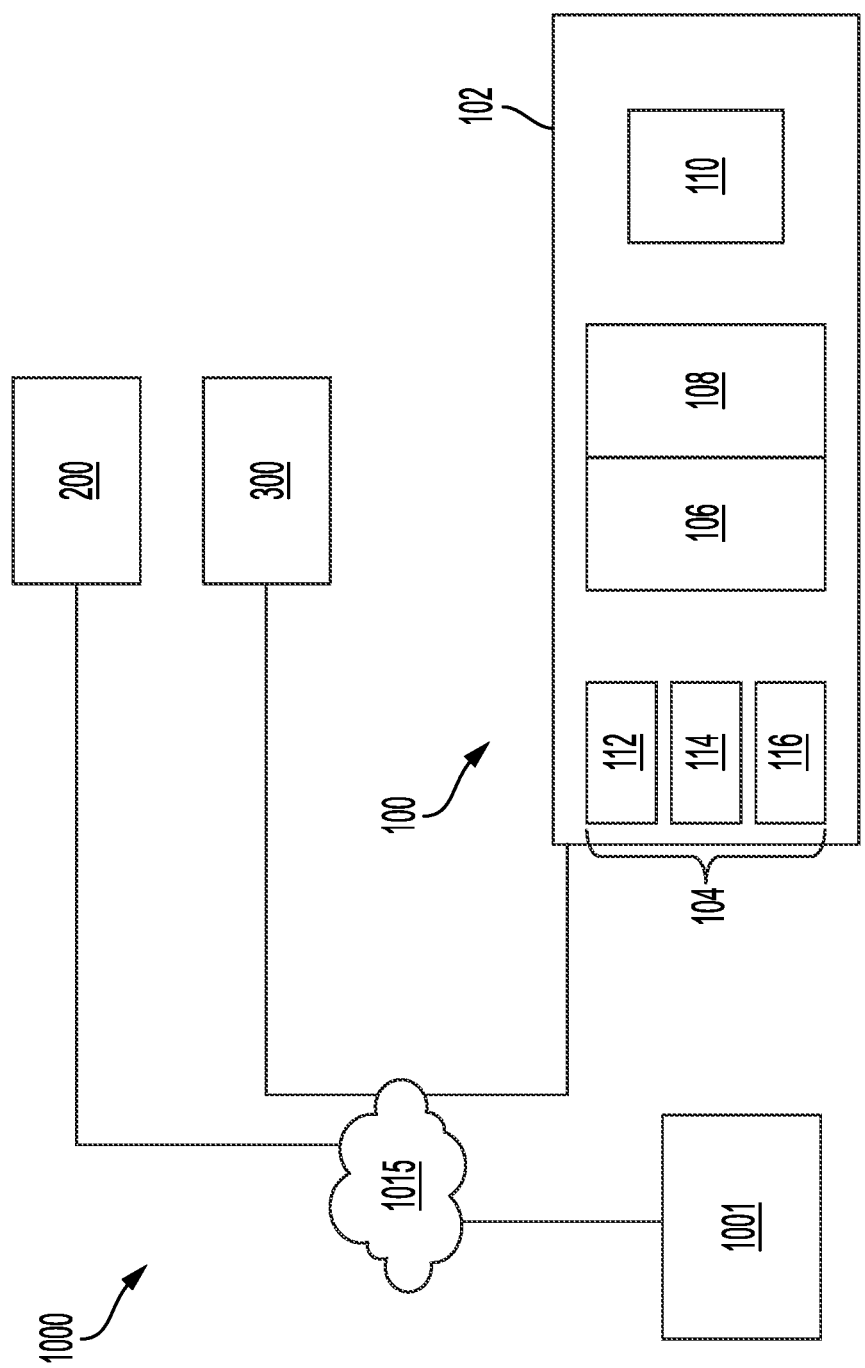
FIG. 1 is a schematic of a measurement system for determining a depth of a downhole device within a borehole.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a sensor" includes one or more of such sensors, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

As used herein, the term "proximal" refers to a direction toward a drill rig or drill operator and generally opposite a direction of drilling (and away from a formation or borehole), while the term "distal" refers to a direction away from the drill rig or drill operator and generally in the direction of drilling (and into a formation or borehole).

As described herein, depth within a borehole, as determined by a length of the drill string, can be understood as the length of the path from a proximal end of the borehole to a sensor or other reference point within the borehole. (It is contemplated that drilling can form a helical (or other non-linear) borehole, so the length of rods overestimate the linear distance from the proximal end of the borehole to the end of the drill string.) It is contemplated that depth within the borehole as determined by inertial measurements can correspond to an absolute positon of a sensor or other reference point within the borehole relative to the proximal end (or distal end, or other reference position) of the borehole. It is further contemplated that depth, as measured by pressure, can refer to a depth relative to a vertical axis.

Figure 2:
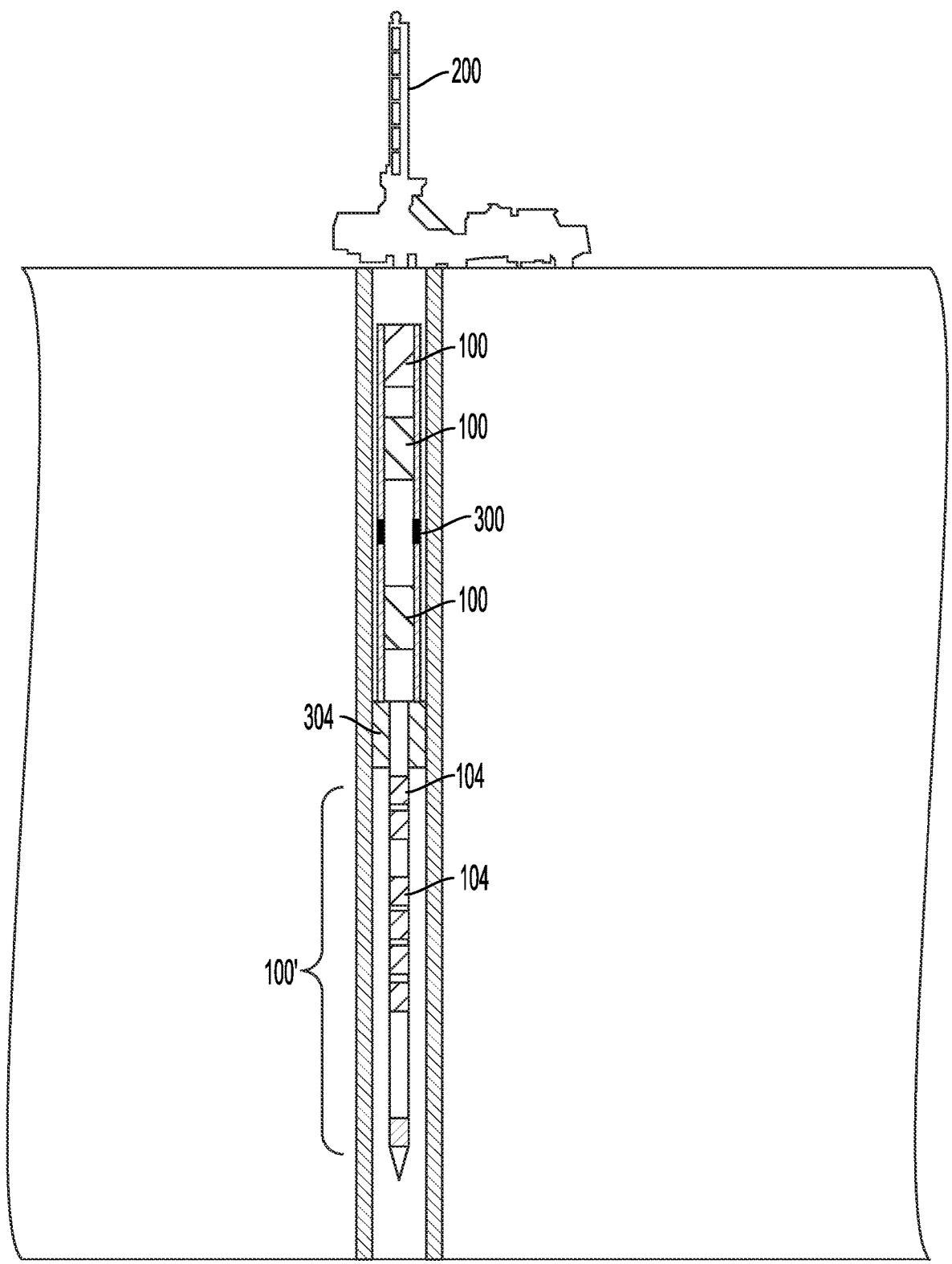
FIG. 2 is a schematic of a drilling system having a measurement system for determining a depth of a downhole device within a borehole.
Figure 3:
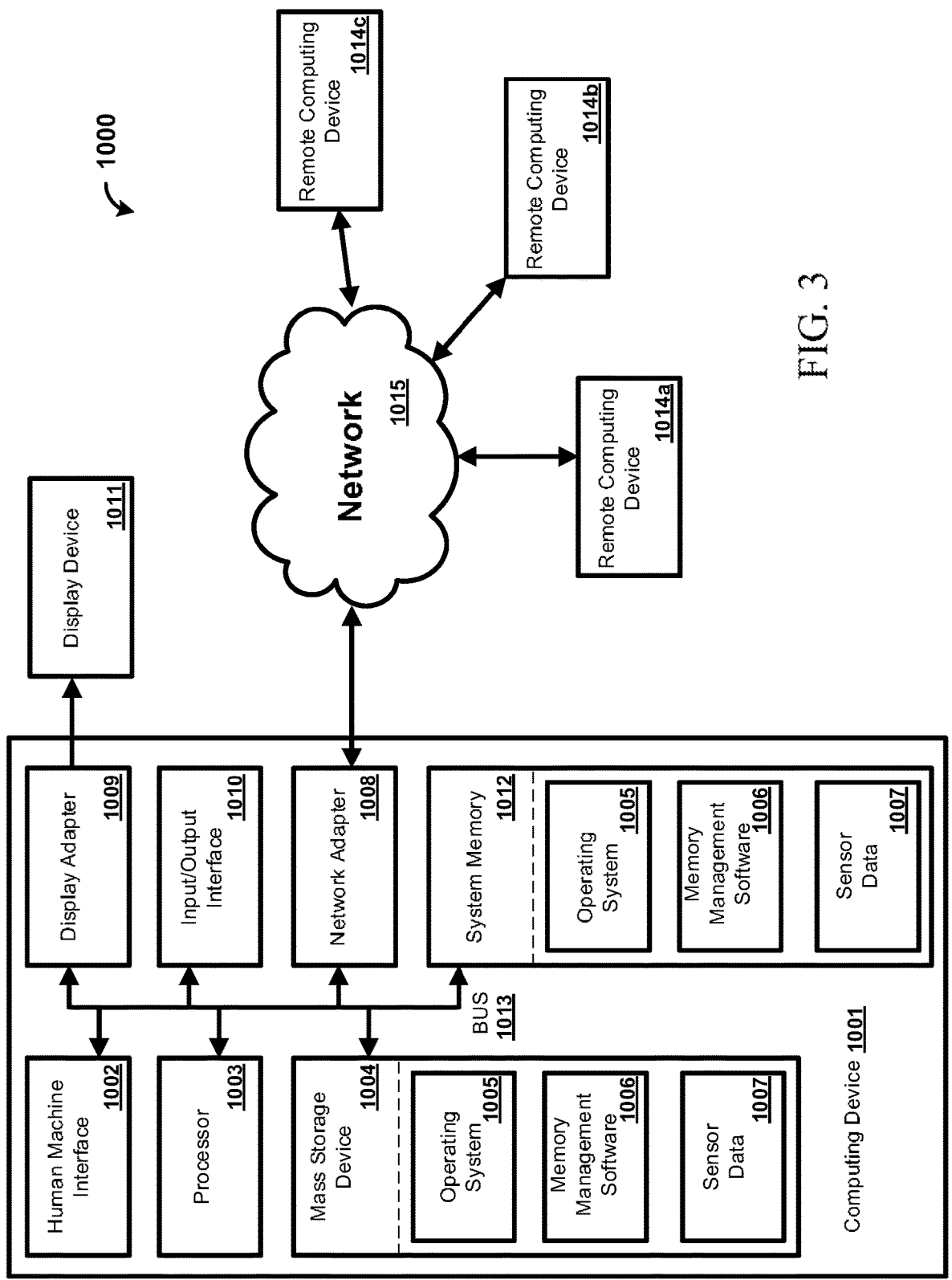
FIG. 3 is a schematic of a measurement system for determining a depth of a downhole device within a borehole.
Figure 5:
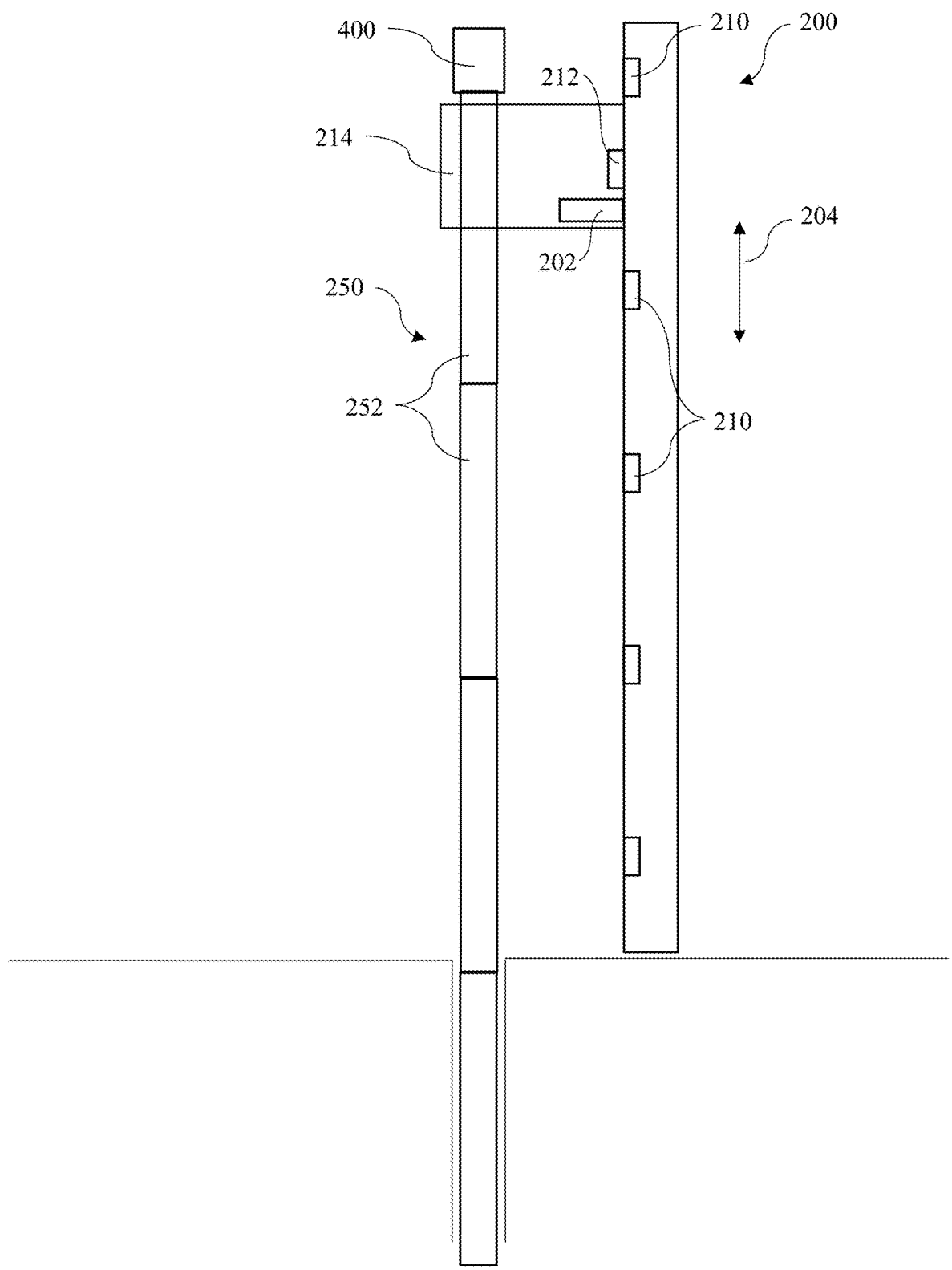
FIG. 5 is a schematic diagram of a drill rig having a mast and different embodiments of mast position sensors.

Disclosed herein, in various aspects and with reference to FIGS. 1-3, is a borehole data collection system 1000. The borehole data collection system 1000 can optionally be autonomous so that data can be collected and processed without operator intervention. The borehole data collection system 1000 can comprise at least one downhole device 100 (optionally, a plurality of downhole devices 100) that can be deployed down a borehole. Optionally, the downhole device 100 can be deployed into an inner bore of the drill string. For example, in some aspects, the downhole device 100 can be embodied as a probe 100'. In further aspects, the downhole device 100 can be embodied as a drill sub that can be integrated into, and a component of, the drill string. The downhole device 100 can comprise a housing 102 and one or more sensors 104 within the housing. The downhole device 100 can further comprise a memory 106 and at least one processor 108. The memory 106 can be configured to store data from the sensors 104. In further aspects, the memory 106 and at least one processor 108 can be separate from, and in communication with, the downhole device 100. For example, in some aspects, a processing module can comprise the memory 106 and at least one processor 108, and the processing module can couple to the downhole device 100 to provide data communication therebetween.

The downhole device 100 can comprise an internal clock 110 that can be synchronized with respective clocks of other devices (e.g., other downhole devices 100) of the borehole data collection system 1000. In this way, data collected from the one or more sensors 104 of each downhole device 100 can be correlated with the time at which the data was collected, thereby enabling correlation with data collected with other sensors (e.g., sensors of other downhole devices 100) of the borehole data collection system 1000. Thus, it is contemplated that the processor 108 of each downhole device 100 can receive data from the sensors 104 of the downhole device and process, combine, and correlate the data with respective time values (e.g., the time at which the data is collected) when storing the collected data in the memory 106. It is contemplated that the internal clock 110 can be integral to the processor 108 and memory 106.

The plurality of sensors 104 of at least one downhole device 100 can comprise one or more inertial sensors 112 (e.g., accelerometers or inertial measurement units (IMUs)). The inertial sensors 104 can be configured to collect inertial measurements and associate the inertial measurements with the time values from the internal clock to create an inertial measurement array. In some aspects, the inertial measurement array can be used in dead reckoning to approximate the position of the downhole device 100 within the borehole or along the drill string. For example, the borehole data collection system 1000 can use acceleration data to determine a velocity (e.g., via numerical integration) and then, using numerical integration of velocity over time, determine a change in position. Thus, the borehole data collection system 1000 can calculate a final position from an initial position and the change in position. In this way, the depth of each respective downhole device 100 can be approximated.

In another aspect, a downhole device can use pressure measurements to measure the depth of the downhole device. For example, in some aspects, the sensors 104 can comprise pressure sensors 114 that can produce spike signatures indicative of downhole movement. The hole can optionally be filled with a fluid in order to provide significant pressure variations at each depth. A first pressure can be taken at a first depth, and a second pressure can be taken at a second depth. The change in pressure between the first pressure and the second pressure can correspond to a change in depth. For example, the change in pressure divided by the product of the density of the fluid and the acceleration due to gravity can provide a depth change from the first depth. Accordingly, changes in pressure can be correlated to changes in depth as a function of density of fluid in the borehole. International Patent Application Publication No. 2015074101, filed Nov. 19, 2014, which is hereby incorporated by reference herein in its entirety, discloses methods and apparatuses for approximating depth based on changes in pressure.

Accordingly, in various aspects, pressure measurements can be used in addition to, or alternatively to, dead reckoning to determine the depth of the downhole device within the borehole. That is, in some aspects, pressure measurement can be excluded, and depth of the downhole device can be determined by inertial data. In further aspects, pressure measurements (without inertial data) can be used as the depth measurement by the downhole device. In still further aspects, pressure measurements and inertial data can cooperatively be used to provide depth measurements of the downhole device with improved accuracy. In still further aspects, a first downhole device can comprise a pressure sensor, and a second downhole device with a known spacing from the first downhole device can comprise at least one inertial sensor, and the first and second downhole devices can each collect respective data, and said data can be used to determine depth measurements of one of the first downhole device or the second downhole device.

In further aspects, one or more IMUs or other inertial sensors (e.g., accelerometers such as, for example, three orthogonally oriented accelerometers), one or more orientation sensors (e.g., gyros or accelerometers), one or more pressure sensors, etc., can be used to determine depth, either together or independently of one another. Such sensors can be used within the one or more downhole devices (e.g., downhole sub and/or probe or other device that is deployable within the drill string). Optionally, only a single downhole device (having a single sensor type) can be used in the disclosed systems. However, in other aspects, and as further described below, it is contemplated that a plurality of different sensor types can be used together (concurrently).

It is contemplated that further data can be used to refine the accuracy of the measured depth of the downhole device 100. In some aspects, an additional depth measurement device can provide additional depth measurements to be used in combination with the approximated depth of the downhole device 100. For example, data from a drill rig 200 (from a rig sensor) can be used to provide a depth measurement. The drill rig can comprise a drill rig position sensor that is configured to determine movement of the drill rig and, accordingly, movement of the drill string. In some aspects, using the drill rig position sensor, the drill rig 200 can provide drill string length data (e.g., a sum of the length of the drill rods added to the drill string less the length of the number of drill rods pulled from the borehole) at any given time. That is, a synchronized clock can be used to store rig data (e.g., number of rods pulled from the drill string—or added to the drill string—at a given time) and correlate the rig data with the time from the synchronized clock. It is contemplated that, in some aspects, the drill rig 200 can comprise a mast position encoder 202 that can measure a length of the drill string that is pulled from the borehole as drill rods are pulled from the drill string. For example, the drill rig 200 can pull the drill string upwardly a length of a single proximal drill rod, remove the proximal drill rod, and repeat. In further aspects, the drill rig can pull and remove multiple rods (e.g., two rods at a time). Rig position data from the mast position encoder 202 can be used to tally the number of drill rods/drill string components added to or removed from the drill string, and the length of the drill string can correspond to the sum of the length of the drill string components. Optionally, the length of a drill string within a borehole can retroactively be determined once the drill string components have been removed from the borehole. When starting from a complete drill string, the drill string components can be sequentially removed and counted or measured (in reverse order of insertion) until the distal end of the drill string reaches the proximal end of the borehole. That is, an unknown length of drill string can later be determined based on the number and length of drill rods removed from the drill string, with the proximal end of the drill string corresponding to a depth of zero and the distal end of the drill string corresponding to the total depth of the drill string. Data logged during tripping out (removal) of drill rods (or drill string components) can then be correlated back to the depth at which the later-determined number (and length) of drill string components were in the hole during data logging. In some aspects, the length that the drill rig moves as detected by the mast position encoder can correspond to a length of a single drill rod (for pulling individual drill rods). In further aspects, the length that the drill rig moves as detected by the mast position encoder can correspond to a length of a plurality of drill rods (e.g., 2 drill rods). Accordingly, the mast position encoder, by tracking the positon of the mast and correlating that position to the number of drill string components removed, can provide data to determine the additional depth measurement. Optionally, it is contemplated that the disclosed sensors can be configured to account for situations where multiple rod lengths are used along the length of the drill string. For example, if both 3-meter rods and 6-meter rods are used, it is contemplated that the sensors can detect variations in the length of individual rods so that the removal or addition of each respective rod type is accurately reflected in the determination of operative drill string length. Additionally, or alternatively, it is contemplated that the system can provide a user interface for manually identifying changes in rod length and/or adjusting the length calculation.

In further aspects, the drill rig can comprise one or more other position sensors that can provide data indicative of the number of drill rods pulled from the borehole. For example, in another exemplary aspect, the drill rig 200 can have a longitudinal (drilling) axis 204 and a plurality of Hall Effect sensors 210 (e.g., optionally, five sensors) that are spaced along the longitudinal axis of the drill rig. The drill rig can further comprise a magnet 212 that moves along the longitudinal axis 204 of the drill rig with the drill string 250 as the drill rig pulls the drill string from the borehole. For example, the magnet can be coupled to a carriage 214 that grips the drill string and moves along the longitudinal axis 204. The Hall Effect sensors 210 can detect proximity of the magnet indicating the position of the drill rig. The Hall Effect sensors 210 can be spaced to provide sufficient resolution to determine whether a single drill rod 252 has been pulled or whether two or more drill rods 252 have been pulled. For example, the Hall Effect sensors 210 can be spaced from each other by less than the length of the drill rod 252. In this way, the plurality of Hall Effect sensors can provide a rough indication of the movement of the drill rig and, accordingly, the drill string. Such a system can be sufficient to detect whether a single drill rod is pulled from the borehole during a single upward movement of the drill string or whether two or more drill rods are pulled during a single upward movement of the drill string. As should be understood, the foregoing examples should be understood as optional systems for determining travel of the drill string that can be correlated to changes in length of the drill string as drill string components are added thereto or removed therefrom. Accordingly, it is contemplated that the rig sensor can comprise the mast encoder 202 or the plurality of Hall Effect sensors 210 and the magnet 212.

In further aspects, an operator can manually count the drill rods pulled and input the count into the system 1000. Accordingly, it is contemplated that the system 1000 can allow a user to select which depth measurement(s) is/are used (e.g., based on all that are available).

According to further aspects, the additional depth measurement device can comprise a wireline encoder. That is, the device 100 can be lowered down the borehole via a wireline cable, and the wireline encoder can provide an output indicative of the deployed length of wireline cable as the device 100 is lowered into the drill string or retracted therefrom.

In some aspects, the sensors 104 can comprise at least one geophysical sensor 116 (e.g., magnetic or radioactivity sensor), the correlated data of which can be used to establish bedding depths and thicknesses.

In some aspects, sensors on the drill rig 200 can be used to infer reason for rod movement. For example, a sensor on the drill rig 200 can detect whether the mast is moving back and forth because the rods are stuck in the hole or whether the mast is moving back and forth because it is pulling drill rods. Accordingly, such sensor data can be input for refining depth calculations.

Optionally, in exemplary aspects, and as further described below, the borehole data collection system 1000 can further comprise a wireless sub 400 coupled to the at least one drill rod. The wireless sub 400 can comprise processing circuitry that is configured to detect mechanical impulses of the drill string. The processing circuitry can be configured to wirelessly transmit signals indicative of the mechanical impulses to a remote computing device, such as a tablet, a computer, a smartphone, a touchscreen device, and the like. Drill rods can be added and removed distally of the wireless sub so that the wireless sub can remain outside of a borehole during use.

When provided, the wireless sub can comprise various sensors for monitoring various aspects of drilling and drilling-associated activities, such as, for example, addition or removal of drill rods, core retrieval, and the like. In some aspects, mounting the wireless sub in-line allows for detecting drill string mechanical impulses, such as, for example, axial and torsional vibrations resulting from dynamic load response. These axial and torsional vibrations can be associated with vibrational signatures that correspond to various operating conditions, such as a likelihood of drill string deformation. Accordingly, measured vibrations can provide information including, but not limited to, an indication of imminent permanent twisting deformation overload. An operator can receive an indication of such vibrational signatures and stop drilling or change the drilling parameters to prevent damage to the drill string. As should be understood, in further aspects, mechanical impulses detected by the wireless sub are not limited to vibrations.

According to some aspects, the wireless sub can couple to the drill string via an adapter sub or with one or more quick-attach adapter subs. A direct coupling of the wireless sub to the drill string (so that the wireless sub forms part of the drill string) enables the wireless sub to measure the vibrations of the drill string. Optionally, the wireless sub can attach to the drill string below the drill rig's top drive unit or to a "Kelly rod" in a hollow-spindle chuck-drive unit. As should be understood, a Kelly rod is a drill rod that is maintained at the top of the drill string while additional drill rods are added or subtracted below it. In some optional aspects, the wireless sub can be mated directly to the Kelly rod. In further aspects, an adapter sub can couple a drilling unit of a top-drive drill rig to the wireless sub. Vibrations of the drill rig can be dampened through the top-drive unit and drill string adapter sub (e.g., adapter subs for top-drive rigs) or through the chuck-drive and Kelly rod. Accordingly, the wireless sub can be at least partially isolated (or completely or substantially completely isolated) from the vibrations of the drill rig. This configuration can be contrasted with, for example, vibration sensors in a floating sub that receive vibrations from the drill rig, which mask the vibrations from the drill string and inhibit detection of drill string vibrational signatures. However, in some aspects, it is contemplated that the wireless sub can be provided in a floating sub configuration.

According to some aspects, the wireless sub can be maintained outside of the borehole throughout a drilling or mining operation. That is, during drill string makeup, drill rods can be added distally of the wireless sub. In maintaining the wireless sub outside of the borehole, the wireless sub is not constrained to a maximum diameter that is less than that of the borehole. Rather, the wireless sub can optionally have a diameter that is greater than the operative diameter of the drill bit or greater than the operative diameter of the borehole. Accordingly, the wireless sub can be sufficiently rigid and can be packaged with sufficient batteries for a long battery life. Further, in maintaining the wireless sub at the proximal end of the drill string and outside the borehole, the wireless sub can optionally maintain constant direct communication (for example, through a wireless communication protocol) with a remote computing device.

In some aspects, an operator can provide inputs to override sensor outputs and/or algorithm calculations. For example, an operator can interface with the system 1000 via a computing device 1001 (e.g., a tablet, smartphone, computer, or touchscreen device) to set known values or eliminate collected data that is known to be inaccurate. For example, the operator can input drill rod (or other drill string component) length, aspects of the pulling method (e.g., one rod at a time or two rods at a time), and/or the core barrel length.

All data from the system 1000 (e.g., data from the downhole device(s) 100, data from the drill rig 200, data from the wireless sub (if provided), and data manually input from the operator via the computing device 1001) can be provided to an algorithm. The algorithm can be optimized using artificial intelligence (AI) to determine proper weighting for each approximation. For example, the algorithm can use rod pulling data from the drill rig 200 to determine that an inertial spike was erroneous (e.g., an inertial spike is stored at a time that the drill rig did not move the drill string) and reduce or eliminate its effect on the depth calculation. As another example, the algorithm can use a weighted average of depth determined with inertial data and depth determined by the depth measurement (e.g., cumulative length of drill rods removed from the borehole). In further aspects, the algorithm can account for expected stretching of the drill rods to verify expected accuracy of the depth determined with inertial data. For example, if, when pulling rods, a depth is determined to be slightly greater than the summed length of the drill string (due to stretching of the drill string in tension), the algorithm can determine that the inertial data is accurate and more heavily weight the depth determined with inertial data in the weighted average.

In some optional aspects, the inertial data (e.g., dead reckoning measurement) can be the primary depth measurement (e.g., most heavily weighted), and the rod counting can be used for additional refinement. In further aspects, the rod counting can be the primary depth measurement, and the inertial data can be used to refine the measurement. In still further aspects, the additional data collected can be used to further refine the depth measurement. It is contemplated that the depth measurement can be automatically determined based on the available information. For example, if the system 1000 comprises only inertial data from the downhole device 100, the system can determine the hole data with only the inertial data. If the system further receives one or more additional measurements (e.g., number of drill rods removed, pressure data, and/or wireline encoder data), the system can determine the hole depth based on only the non-inertial measurement(s) (e.g., number of drill rods removed, pressure data, and/or wireline encoder data), the inertial data from the downhole device, or both. Optionally, the system 1000 can determine whether or not to use the additional measurement(s) or how to weight the additional measurement(s) based on their respective expected accuracy. It is further contemplated that an operator can manually select what data (inertial data, number of drill rods removed, pressure data, and/or wireline encoder data) the system 1000 uses to determine the hole depth data.

In some aspects, resolution can be determined based on the data input. For example, an operator manually counting rods can be considered low resolution and prone to a first level of error. A combination of inertial measurement units, drill rig mast sensor data, and manual operator rod counting can provide a medium amount of resolution that is prone to a second level of error that is less than the first level of error. A combination of inertial measurement units, drill rig mast sensor data, manual operator rod counting, geosensor data, and orientation data can provide a high resolution that is prone to a third level of error that is less than the second level of error.

Because the system 1000 is capable of capturing depth measurement data without maintaining the wireline in tension, the system 1000 can be used to measure depth while drilling or while tripping.

An implementation for the disclosed system can involve an array of raw sensor outputs, manual user inputs, adherence to workflow recommendations, and a processing algorithm that calculates the linear position of a downhole device 100 and correlates it to additional data. Optionally, the additional data can comprise orientation data, such as, for example, azimuthal angle or dip angle (e.g., an angle relative to a horizontal plane). Accordingly, it is optionally contemplated that the inertial sensors 112 can be configured to provide data to determine the depth of the downhole device 100 within the hole as well as additional data. Thus, for example, in some aspects the system can store an azimuthal angle, and a dip angle for each hole depth. In further aspects, the additional data can be captured by one or more additional sensors. For example, the system 1000 can comprise a pressure sensor that can capture pressure data, and/or a camera that can be configured to capture visual/image data, and/or one or more geophysical sensors that are configured to capture geophysical data. The image, pressure, and geophysical data can each be correlated to the depth at which the respective image and pressure data was captured. It is further contemplated that the one or more additional sensors can each be spaced by a respective known distance from the device 100 so that the data from the additional sensors can be associated with the hole depth of the additional sensor itself via an adjustment by the known distance (e.g., a predetermined step change). The processing algorithm can optionally be used after all data has been collected and the sensors have been retrieved. Data from the sensors (e.g., sensors 104 of the downhole device 100) can be provided wirelessly or via wired communication to the system 1000.

The implementation can also provide a user interface for 'pairing' the array of sensor outputs, initializing the system, retrieving data and assessing the results. The algorithm may apply quality ratings for each survey type based on the available sensor paired to the system as well as the measured raw sensor output values measured during deployment.

In some exemplary aspects, a workflow for the determining depth measurements as disclosed herein can comprise the following:

In exemplary aspects, the disclosed system can be used to determine an end-of-hole (EOH) depth. Optionally, the at least one downhole tool 100 can comprise a probe that can extend beyond the bit (for example, through an opening in the bit). Accordingly, the drill string can be retracted with sufficient rods removed to accommodate the probe length. If needed, the borehole can be flooded.

An operator can access a user interface to view available sensors for the depth determination functionality and required survey sensor type (i.e. azimuth/dip, geophysical etc.). The operator can select from available sensors used for the autonomous depth system and for the chosen survey type. User inputs may also be entered at this stage. User inputs may include information about equipment, hole size, or condition, etc.

Once selections and inputs have been made, the system can be initialized either manually or automatically, and the tool can be deployed (e.g., the downhole device 100 can be lowered into the drill string). Optionally, the downhole device 100 can be lowered and docked with a drill bit. Optionally, the starting depth can be approximated via wireline encoder. As disclosed herein, sensor arrays for the system 1000 can comprise both sensors located in the downhole instrument or on surface on or near the drill rig.

Optionally, for certain applications (e.g., diamond drilling applications), after the system is initialized, the downhole device 100 can be lowered through the rods to the bottom of a hole using gravity or pump pressure. Upon the downhole device 100 reaching the bottom of the hole, the drilling crew can begin pulling the rods while the sensor array logs data from the borehole with corresponding depth measurements (referred to as measuring while tripping, or MWT). Depending on the desired survey type, the user interface may guide the user or the machine towards optimum rod pull speeds. In some aspects, the logging can be performed at about 8 meters per minute, or greater than 20 meters per minute, or at least 24 meters per minute. Upon reaching the surface or proximal end of the borehole, the sensor array output data and other data (survey type sensor output data) can be combined and automatically run through the autonomous depth system algorithm to produce a complete depth correlated log of the hole, complete with a secondary QA/QC log of the deployment and depth algorithm statistics. In exemplary aspects, the sensor output data can comprise geophysical data, such as, for example and without limitation, spectral or natural gamma data. FIG. 4 is an exemplary output to a display interface. Optionally, the system 1000 can provide system status during logging (e.g., MWT). In further aspects, the system can generate a report after completion of logging. For example, referring to FIG. 4, a log report can comprise header information, scale, legend, etc. information, tool information (e.g., sensor location, calibration info, algorithm version, etc.), a summary of data input by an operator, a depth correlated plot, and a log event commentary.

A similar process as above may be used in reverse circulation boreholes, except the downhole device 100 can be positioned behind the bit inside the rods. This may require additional user inputs to ensure the survey sensors (i.e. position and geophysical) have the correct compensation factors applied to the final output (i.e. to account for steel casing, distance to formation etc.).

Computing Device

FIG. 3 shows a system 1000 including an exemplary configuration of a computing device 1001 for use with the downhole device 100. It is contemplated that the computing device 1001 can be, for example, a smartphone, tablet, laptop, or desktop computer that an operator can interface with. The computing device 1001 can further display various data collected by sensors (e.g., sensors of the downhole device 100, the drill rig 200, the sub 300, and any other associated sensors), display processed data based on the collected data (e.g., depth approximations) as well as enable the operator to sort and manipulate the data. The computing device 1001 can optionally receive various inputs from an operator. In further aspects, the computing device 1001 can enable the operator to control aspects of the drill rig 200 (e.g., drill rotation speed or tripping speed). In various aspects, the computing device 1001 can apply the depth algorithm to determine the approximated depth based on the sensor data. In further aspects, another device or a cloud computing system can apply the algorithm and provide the results to the computing device 1001.

It is further contemplated that various aspects of the downhole device 100 can be configured in accordance with the computing device 1001, as further disclosed herein.

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as sensor data 1007 (e.g., data from signals received by the inertial sensors) and/or program modules such as operating system 1005 and dead reckoning software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and dead reckoning software 1006 may be stored on the mass storage device 1004. One or more of the operating system 1005 and dead reckoning software 1006 (or some combination thereof) may comprise program modules and the dead reckoning software 1006. Sensor data 1007 may also be stored on the mass storage device 1004. Sensor data 1007 may be stored in any of one or more databases known in the art. The databases may be centralized or distributed across multiple locations within the network 1015.

A user may enter commands and information into the computing device 1001 using an input device (not shown). Such input devices comprise, but are not limited to, a keyboard, pointing device (e.g., a computer mouse, remote control), a microphone, a joystick, a scanner, a touchscreen (e.g., that of a tablet or smartphone), tactile input devices such as gloves, and other body coverings, motion sensor, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computing device 1001 may be part of one device, or separate devices.

The computing device 1001 may operate in a networked environment using logical connections to one or more remote computing devices 1014a,b,c. A remote computing device 1014a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014a,b,c may be made using a network 1015, such as a local area network (LAN), a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014a,b,c can optionally have some or all of the components disclosed as being part of computing device 1001. It is contemplated that, for example the remote computing device 1014a can be on the downhole device 100 (FIG. 1), the remote computing device 1014b can be a computing device of the drill rig 200 (FIG. 1) that can provide, for example, mast position encoder data or tripping counts, and the remote computing device 1014c can be on the sub 300 (FIG. 1). In other aspects, it is contemplated that the computing device 1001 can be in communication with at least one remote computing device that is configured to provide off-site processing (e.g., quality control) of data provided by the computing device 1001. In various aspects, it is contemplated that some or all aspects of data processing can be performed via cloud computing on one or more servers or other remote computing devices. Accordingly, at least a portion of the system 1000 can be configured with internet connectivity.

Machine Learning

The computing device can use artificial intelligence to apply machine learning in optimizing accuracy of the depth measurement. In one aspect, the computing device (e.g., the computing device 1001) that applies the algorithm can comprise a machine learning module. The machine learning module can be configured to, for example, determine whether depth based on sensor data (e.g., IMU array data or other inertial measurement data or pressure data) is consistent with the actual travel of the downhole device 200. Although disclosed herein with reference to IMU array data, it should be understood that any suitable data can be used, such as an array of data from an inertial sensor, orientation sensor, pressure sensor, or any other sensor or any combination of data from multiple sensors.

The machine learning module may take empirical data as an input and recognize patterns within the data. As an example, the empirical data may be the data (e.g., IMU) array.

The machine learning module may use a trained classifier when determining whether a given sensor data (e.g., IMU) value in the sensor data (e.g., IMU) array is likely to correspond to actual movement of the downhole device. In making this determination, the machine learning module may determine whether an aggregate of one or more IMU characteristics meet or exceed a prediction threshold. For example, if the aggregate of the one or more performance metrics results in a prediction of 70% that the downhole device has moved in accordance with the data from the sensor data array (IMU array), then the prediction threshold may be met (e.g., a prediction above 70% may therefore exceed the threshold). Other values for the prediction threshold may be used.

Each of the one or more sensor data (e.g., IMU) characteristic metrics may be associated with a value of the sensor data (e.g., IMU) characteristic, such as a sensor data (e.g., IMU) characteristic threshold. The aggregate of the one or more sensor data (e.g., IMU) characteristic metrics may not meet or exceed a metric threshold when the mean sensor data (e.g., IMU) value for the device is determined to fall below the expected mean value. As another example, a sensor data (e.g., IMU) characteristic metric may relate to an amount by which a sensor data (e.g., IMU) value for the downhole device for a time interval during the tripping (e.g., an hour) deviates from the mean sensor data (e.g., IMU) value for the downhole device throughout the entire tripping of the drill string. When the level of sensor data (e.g., IMU) value for the downhole device during the time interval deviates at least a specified number of standard deviations (e.g., 3) from the mean sensor data (e.g., IMU) value, the level of sensor data (e.g., IMU) value for that time interval may be considered an outlier and thus falling below (e.g., not meeting or exceeding) the sensor data (e.g., IMU) characteristic threshold. As a further example, a sensor data (e.g., IMU) characteristic metric may relate to a level of skewness of a distribution of values of the level of sensor data (e.g., IMU) values for the downhole device during each of a plurality of time intervals during drill string tripping. The level of skewness may be a measure of a symmetry of the distribution of the values of the level of sensor data (e.g., IMU) values for the downhole device during each of the plurality of time intervals of the day with respect to the mean sensor data (e.g., IMU) value for the downhole device during the day. When the level of skewness is determined to be at least a specified level of skewness (e.g., less than −0.4 or greater than 0.4), the level of sensor data (e.g., (IMU) value for that time interval may be considered to fall below (e.g., not meeting or exceeding) the performance threshold.

The machine learning model may include parameters, such as the plurality of sensor data (e.g., IMU) characteristic metrics/features that are optimized by the machine learning module for maximizing an accuracy function associated with the machine learning model given the input sensor (e.g., IMU) array data. For instance, in the context of classification (e.g., determining whether a given sensor data (e.g., IMU) value is consistent with movement of the downhole device), the machine learning model may be visualized as a straight line that separates the sensor data (e.g., IMU) characteristic data into two classes (e.g., labels). The accuracy function may consider a number of misclassified points of sensor data (e.g., IMU) characteristic data. The misclassified points may be a plurality of data points (e.g., one or more sensor data (e.g., IMU) characteristic metrics) that the machine learning model incorrectly classifies as not meeting or exceeding the sensor data (e.g., IMU) characteristic threshold. A learning process of the machine learning model may be employed by the machine learning module to adjust coefficient values for the parameters such that the number of misclassified points is minimal. After this optimization phase (e.g., learning phase), the machine learning model may be used to classify new data points for a test sensor data (e.g., IMU data).

The machine learning module may employ one or more supervised, unsupervised, or semi-supervised machine learning models. Generally, supervised learning entails the use of a training set of data as discussed herein that may be used to train the machine learning model to apply labels to the input data. For example, the training data may include sensor data (e.g., IMU) characteristic data containing a plurality of data points (e.g., IMU characteristic metrics) that may, or may not, meet the sensor data (e.g., IMU) characteristic metric threshold and may be labeled as such. Unsupervised techniques, on the other hand, do not require a training set of labels. While a supervised machine learning model may determine whether previously seen patterns in a training dataset have been correctly labeled in a testing dataset, an unsupervised model may instead determine whether there are sudden changes in values of the plurality of data points. Semi-supervised machine learning models take a middle ground approach that uses a greatly reduced set of labeled training data as known in the art.

The machine learning module may employ one or more machine learning algorithms such as, but not limited to, a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic or other regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The machine learning module may include any number of machine learning models to perform the techniques herein, such as for cognitive analytics, predictive analysis, and/or trending analytics as known in the art.

Performance of the machine learning module may be evaluated in a number of ways based on a number of true positives, false positives, true negatives, and/or false negatives classifications of the plurality of data points indicated by the machine learning model. For example, a false positive can refer to finding an inertial spike (from the sensor data (e.g., IMU) array) to indicate movement when contradictory data from the drill rig indicates that no rods were moved. A false negative can refer to a lack of determining an inertial movement when contradictory data from the drill rig indicates that the downhole apparatus moved. A user may compliment the machine learning by identifying false or true positive as well as false or true negatives. Related to these measurements are the concepts of recall and precision. Generally, recall refers to a ratio of true positives to a sum of true positives and false negatives, which quantifies a sensitivity of the machine learning model. Similarly, precision refers to a ratio of true positives a sum of true and false positives.

Exemplary Aspects

In view of the described device, systems, and methods and variations thereof, herein below are certain more particularly described aspects of the invention. These particularly recited aspects should not, however, be interpreted to have any limiting effect on any different claims containing different or more general teachings described herein, or that the "particular" aspects are somehow limited in some way other than the inherent meanings of the language literally used therein.

Aspect 1: A system comprising: a downhole device comprising at least one inertial sensor; at least one processor; a memory in communication with the at least one processor, wherein the memory comprises instructions thereon that, when executed, cause the processor to: receive data from the at least one inertial sensor; store the data from the at least one inertial sensor in the memory with respective correlated time values; and a drill rig comprising at least one depth measurement device, wherein the at least one depth measurement device comprises: a drill string position sensor that is configured to produce a measurement indicative of a length of a portion of a drill string removed from a borehole; or a wireline sensor that is configured to determine a length of deployed wireline cable.

Aspect 2: The system of aspect 1, wherein the drill rig comprises a mast, wherein the at least one depth measurement device comprises the drill string position sensor, wherein the drill string position sensor comprises a mast position encoder that is configured to determine a length of movement of the drill string relative to the mast, wherein the length of movement of the drill string corresponds to a number of drill string components pulled from a borehole.

Aspect 3: The system of aspect 1 or aspect 2, wherein the at least one inertial sensor is a three-dimensional accelerometer.

Aspect 4: The system of any one of the preceding aspects, further comprising: a drill sub disposed within the drill string, wherein the drill sub comprises an orientation sensor.

Aspect 5: The system of aspect 4, wherein the orientation sensor is a gyroscope.

Aspect 6: The system of any one of the preceding aspects, wherein the downhole device further comprises a pressure sensor, wherein the memory comprises instructions thereon that, when executed, cause the processor to: receive data from the pressure sensor; and store the data from the pressure sensor in the memory with respective correlated time values.

Aspect 7: The system of any one of the preceding aspects, further comprising: a computing device comprising at least one processor and a memory in communication with the at least one processor of the computing device, wherein the computing device is configured to receive the data from the at least one inertial sensor and the respective correlated time values, wherein the memory of the computing device comprises instructions thereon that, when executed by the at least one processor of the computing device, cause the at least one processor of the computing device to: determine a calculated position of the downhole device at a given time using numerical integration of the data from the at least one inertial sensor.

Aspect 8: The system of aspect 7, wherein the computing device is configured to receive data from the encoder at least one depth measurement device, wherein the memory of the computing device comprises instructions thereon that, when executed by the at least one processor of the computing device, cause the at least one processor of the computing device to: determine an adjusted calculated position of the downhole device at the given time based on the data from the encoder at least one depth measurement device.

Aspect 9: The system of aspect 7 or aspect 8, wherein the computing device comprises the memory in communication with the at least one processor of the downhole device.

Aspect 10: The system of any one of aspects 7-9, wherein the computing device comprises a machine learning module that is configured to improve an accuracy of the calculated position of the downhole device at the given time.

Aspect 11: The system of any one of the preceding aspects, wherein the downhole device is deployable into the drill string.

Aspect 12: The system of any one of aspects 1-10, wherein the downhole device comprises a drill sub that is configured to be a component of the drill string.

Aspect 13: A method comprising: receiving, from a downhole device, using a computing device, a plurality of inertial measurements and a respective time value for each inertial measurement of the plurality of inertial measurements; receiving, by the computing device, at least one depth measurement indicative of an operative length of a drill string; and determining, by the computing device, a depth of the downhole device within the drill string based on the plurality of inertial measurements and the at least one depth measurement.

Aspect 14: The method of aspect 13, wherein the at least one depth measurement is a function of a number of drill string components pulled from a drill string and respective lengths of the drill string components pulled from the drill string.

Aspect 15: The method of aspect 13 or aspect 14, wherein the downhole device is coupled to a wireline system, wherein the wireline system comprises a wireline encoder, wherein the at least one depth measurement comprises a measurement from the wireline encoder that is indicative of an operative length of deployed wireline cable.

Aspect 16: The method of any one of aspects 13-15, wherein the computing device applies an algorithm to determine the depth of the downhole device within the drill string, and wherein the method further comprises: using a machine learning module to improve the algorithm.

Aspect 17: The method of any one of aspects 13-16, wherein the plurality of inertial measurements are provided as an inertial measurement data array, the method further comprising: prior to receiving the inertial measurement data array, deploying the downhole device into the drill string and collecting, by the downhole device, inertial measurement data that populate the inertial measurement data array.

Aspect 18: The method of any one of aspects 13-17, further comprising: receiving an input from an operator, wherein determining, by the computing device, the depth comprises determining the depth based on the plurality of inertial measurements, the number of drill string components pulled from the drill string, and the input from the operator.

Aspect 19: The method of any one of aspects 13-18, further comprising: receiving a plurality of signals from a rig sensor, wherein the plurality of signals from the rig sensor are indicative of movement of the drill string; and determining, based on the plurality of signals from the rig sensor, whether the movement of the rig sensor is due to one of: removal of a drill rod from a borehole or the drill string being stuck in the borehole.

Aspect 20: The method of aspect 19, wherein the rig sensor comprises a position sensor.

Aspect 21: The method of aspect 19, wherein the rig sensor comprises a wireless sub that is coupled to the drill string, wherein the wireless sub comprises at least one sensor that is configured to detect mechanical impulses of the drill string.

Aspect 22: The method of any one of aspects 13-21, further comprising: receiving an input from an operator, wherein determining, by the computing device, the depth comprises determining the depth based on the plurality of inertial measurements, the number of drill string components pulled from the drill string, and the input from the operator.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A system comprising:
   a downhole device comprising at least one inertial sensor;
   at least one processor;
   a memory in communication with the at least one processor, wherein the memory comprises instructions thereon that, when executed, cause the at least one processor to:
      receive data from the at least one inertial sensor;
      store the data from the at least one inertial sensor in the memory with respective correlated time values; and
   a drill rig having a longitudinal axis, wherein the drill rig is configured to move a drill string comprising at least one drill rod within a borehole, wherein the drill rig comprises at least one depth measurement device, wherein the at least one depth measurement device comprises:
      a drill rig position sensor that is configured to detect a change in position of the drill rig, wherein the detected change in position of the drill rig is indicative of a length of a portion of the drill string removed from a borehole, wherein the drill rig position sensor comprises:
         a mast position encoder; or
         a plurality of Hall Effect sensors spaced along the longitudinal axis of the drill rig,
   wherein the memory further comprises instructions thereon that, when executed by the at least one processor, cause the at least one processor to:
      determine a potential movement of the downhole device based on the data from the at least one inertial sensor; and
      associate a change of depth of the downhole device corresponding to the potential movement if and only if the drill rig position sensor indicates a change in position of the drill string corresponding to the potential movement.

2. The system of claim 1, wherein the drill rig comprises:
   a mast; and
   a carriage that is movable along the mast,
   wherein the drill rig position sensor comprises a mast position encoder coupled to the carriage.

3. The system of claim 1, wherein the at least one inertial sensor is a three-dimensional accelerometer.

4. The system of claim 1, further comprising a drill sub disposed within the drill string, wherein the drill sub comprises an orientation sensor.

5. The system of claim 4, wherein the orientation sensor is a gyroscope.

6. The system of claim 1, wherein the downhole device further comprises a pressure sensor, wherein the memory comprises instructions thereon that, when executed, cause the processor to:
   receive data from the pressure sensor; and
   store the data from the pressure sensor in the memory with respective correlated time values.

7. The system of claim 1, further comprising:
   a computing device comprising at least one processor and a memory in communication with the at least one processor of the computing device, wherein the computing device is configured to receive the data from the at least one inertial sensor and the respective correlated time values, wherein the memory of the computing device comprises instructions thereon that, when executed by the at least one processor of the computing device, cause the at least one processor of the computing device to: determine a calculated position of the downhole device at a given time using numerical integration of the data from the at least one inertial sensor.

8. The system of claim 7, wherein the computing device is configured to receive data from the at least one depth measurement device, wherein the memory of the computing device comprises instructions thereon that, when executed by the at least one processor of the computing device, cause the at least one processor of the computing device to: determine an adjusted calculated position of the downhole device at the given time based on the data from the at least one depth measurement device.

9. The system of claim 7, wherein the downhole device comprises the computing device.

10. The system of claim 7, wherein the computing device comprises a machine learning module that is configured to improve an accuracy of the calculated position of the downhole device at the given time.

11. The system of claim 1, wherein the downhole device is deployable into the drill string.

12. The system of claim 1, wherein the downhole device comprises a drill sub that is configured to be a component of the drill string.

13. A method comprising:
receiving, from a downhole device within or associated with a drill string comprising at least one drill rod, using a computing device, a plurality of inertial measurements and a respective time value for each inertial measurement of the plurality of inertial measurements;
detecting, by a drill rig position sensor in communication with the computing device, a change in position of a drill rig to which the drill string is secured, wherein the detected change in position of the drill rig is indicative of a length of a portion of the drill string removed from a borehole;
determining, by the computing device, at least one depth measurement indicative of an operative length of the drill string, wherein the at least one depth measurement is determined based on the detected change in position of the drill rig; and
determining, by the computing device, a depth of the downhole device within the drill string based on the plurality of inertial measurements and the at least one depth measurement, wherein determining the depth of the downhole device comprises:
  determining a potential movement of the downhole device based on the data from the at least one inertial sensor; and
  associating a change of depth of the downhole device corresponding to the potential movement if and only if the drill rig position sensor indicates a change in position of the drill string corresponding to the potential movement.

14. The method of claim 13, wherein the at least one depth measurement is a function of a number of drill string components pulled from a drill string and respective lengths of the drill string components pulled from the drill string.

15. The method of claim 13, wherein the computing device applies an algorithm to determine the depth of the downhole device within the drill string, and wherein the method further comprises: using a machine learning module to improve the algorithm.

16. The method of claim 13, wherein the plurality of inertial measurements are provided as an inertial measurement data array, the method further comprising: prior to receiving the inertial measurement data array, deploying the downhole device into the drill string and collecting, by the downhole device, inertial measurement data that populate the inertial measurement data array.

17. The method of claim 13, further comprising: receiving an input from an operator, wherein determining, by the computing device, the depth comprises determining the depth based on the plurality of inertial measurements, a number of drill string components pulled from the drill string, and the input from the operator.

18. The method of claim 13, further comprising:
receiving a plurality of signals from the drill rig position sensor, wherein the plurality of signals from the drill rig position sensor are indicative of movement of the drill rig; and
determining, by the computing device, based on the plurality of signals from the drill rig position sensor, whether the movement of the drill rig is due to one of: removal of a drill rod from a borehole or the drill string being stuck in the borehole.

19. A system comprising:
a downhole device comprising at least one inertial sensor;
at least one processor;
a memory in communication with the at least one processor, wherein the memory comprises instructions thereon that, when executed, cause the at least one processor to:
  receive data from the at least one inertial sensor;
  store the data from the at least one inertial sensor in the memory with respective correlated time values; and
a drill rig having a longitudinal axis, wherein the drill rig is configured to move a drill string comprising at least one drill rod within a borehole, wherein the drill rig comprises at least one depth measurement device, wherein the at least one depth measurement device comprises:
  a drill rig position sensor that is configured to detect a change in position of the drill rig, wherein the detected change in position of the drill rig is indicative of a length of a portion of the drill string removed from a borehole, wherein the drill rig position sensor comprises a plurality of Hall Effect sensors spaced along the longitudinal axis of the drill rig.

20. The system of claim 19, wherein the drill rig comprises:
a mast; and
a carriage that is movable along the mast; and
a magnet coupled to the carriage,
wherein the plurality of Hall Effect sensors are configured to detect proximity of the magnet to thereby detect a position of the drill rig.

* * * * *